(12) United States Patent
Berger et al.

(10) Patent No.: US 11,770,049 B2
(45) Date of Patent: Sep. 26, 2023

(54) GENERATING ELECTRIC POWER FOR A ROBOTIC END EFFECTOR

(71) Applicant: Applied Materials, Inc., Santa Clara, CA (US)

(72) Inventors: Alexander Berger, Palo Alto, CA (US); Paul Lawrence Korff, Sunnyvale, CA (US); William Paul Laceky, Georgetown, TX (US); Jeffrey C. Hudgens, San Francisco, CA (US); Rajkumar Thanu, Santa Clara, CA (US); Damon K. Cox, Jarrell, TX (US); Matvey Farber, Redwood City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 354 days.

(21) Appl. No.: 17/030,094

(22) Filed: Sep. 23, 2020

(65) Prior Publication Data

US 2022/0088803 A1    Mar. 24, 2022

(51) Int. Cl.
*B25J 19/00* (2006.01)
*H02K 7/18* (2006.01)
*B25J 17/00* (2006.01)
*B25J 13/08* (2006.01)
*B25J 9/10* (2006.01)
(Continued)

(52) U.S. Cl.
CPC ............ *H02K 7/1807* (2013.01); *B25J 9/108* (2013.01); *B25J 13/088* (2013.01); *B25J 17/00* (2013.01); *B25J 19/0029* (2013.01); *H02K 1/278* (2013.01); *H02K 7/11* (2013.01); *H02K 16/005* (2013.01); *H02K 17/44* (2013.01); *H02K 21/28* (2013.01); *B25J 11/0095* (2013.01); *B25J 19/005* (2013.01)

(58) Field of Classification Search
CPC .... B25J 9/0029; B25J 17/0241; B25J 19/005; B25J 11/0095
See application file for complete search history.

(56) References Cited

U.S. PATENT DOCUMENTS 4,223,313 A * 9/1980 Chabrol ............... B25J 17/0241
340/870.07
8,264,187 B2  9/2012 Laceky et al.
(Continued)

OTHER PUBLICATIONS

Amazon.com: "CrocSee Micro 3 Phase AC Mini Hand Brushless Motor Generator Model Experiment Teaching Aid: Toys & Games", Jun. 23, 2020. pp. 1-8.
(Continued)

*Primary Examiner* — Bobby Rushing, Jr.
(74) *Attorney, Agent, or Firm* — Lowenstein Sandler LLP

(57) ABSTRACT

A robot device includes a first link and a second link coupled to the first link via an elbow. One or more of the first link or the second link rotates about an axis of the elbow. The robot device further includes a generator disposed in the elbow. The generator is configured to generate electrical power based on relative angular mechanical movement associated with the elbow. The robot device further includes an end effector configured to transport a substrate within a substrate processing system. The end effector is disposed at a distal end of the second link. The end effector is to receive the electrical power generated by the generator.

20 Claims, 6 Drawing Sheets

(51) Int. Cl.
*H02K 1/278* (2022.01)
*H02K 17/44* (2006.01)
*H02K 16/00* (2006.01)
*H02K 21/28* (2006.01)
*H02K 7/11* (2006.01)
*B25J 11/00* (2006.01)

(56) References Cited

U.S. PATENT DOCUMENTS

| | | |
|---|---|---|
| 8,599,531 B2 | 12/2013 | Sundar et al. |
| 8,692,500 B2 | 4/2014 | Laceky et al. |
| 10,286,564 B2 * | 5/2019 | Baumgartner ......... B25J 19/005 |
| 10,461,592 B2 * | 10/2019 | Klassen ................... H02K 9/00 |

OTHER PUBLICATIONS

Pseudo Direct Drive PDD, "Direct drive high torque, low speed e-machine", Magnomatics, Jun. 23, 2020. One page. www.magnomatics.com/pages/technology/pseudo-direct-drive.htm.

Syam, et al., "Comparison of Axial Magnetic Gears Based on Magnetic Composition Topology Differences", Energies 2018, 11, 153. pp. 1-15.

\* cited by examiner

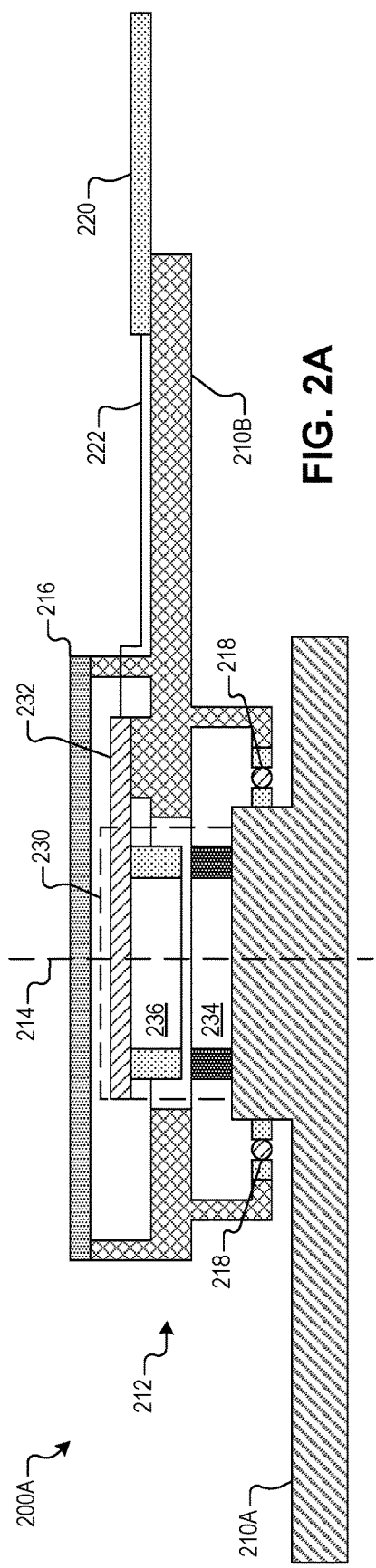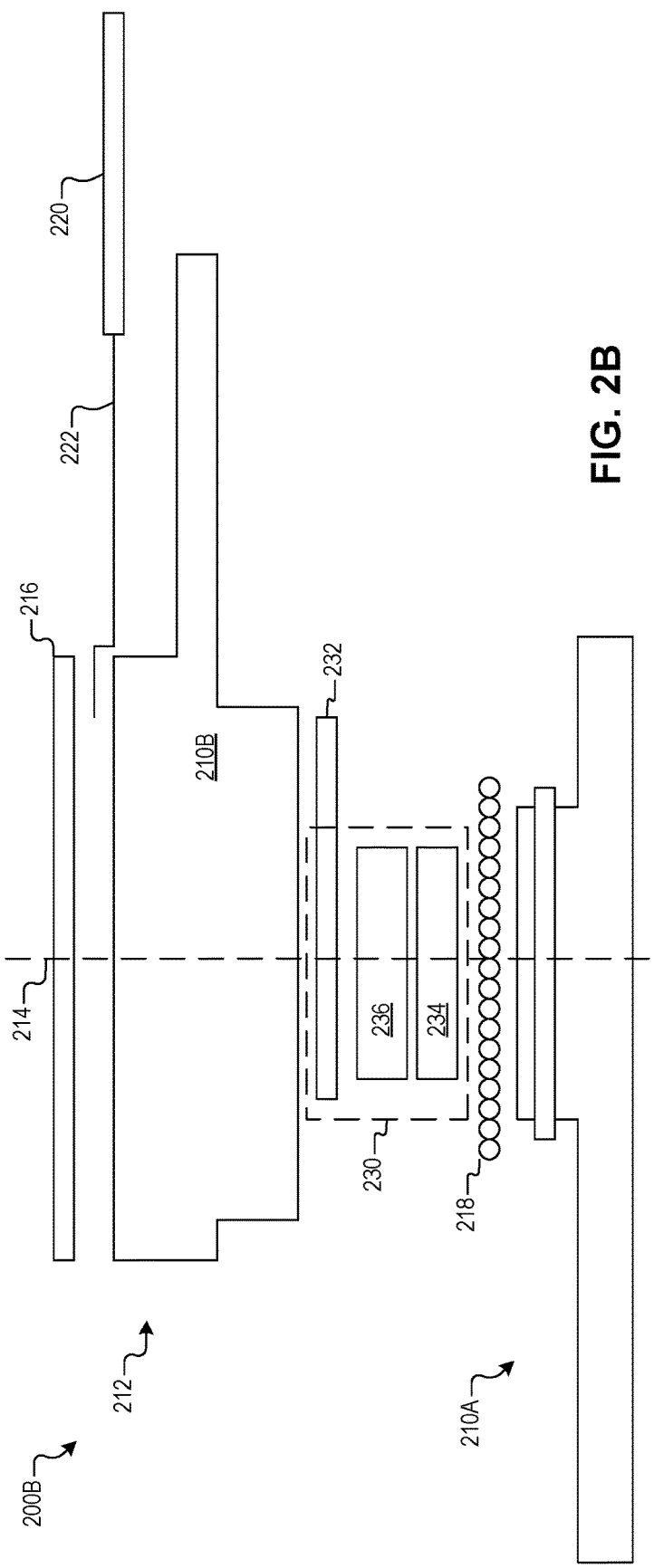

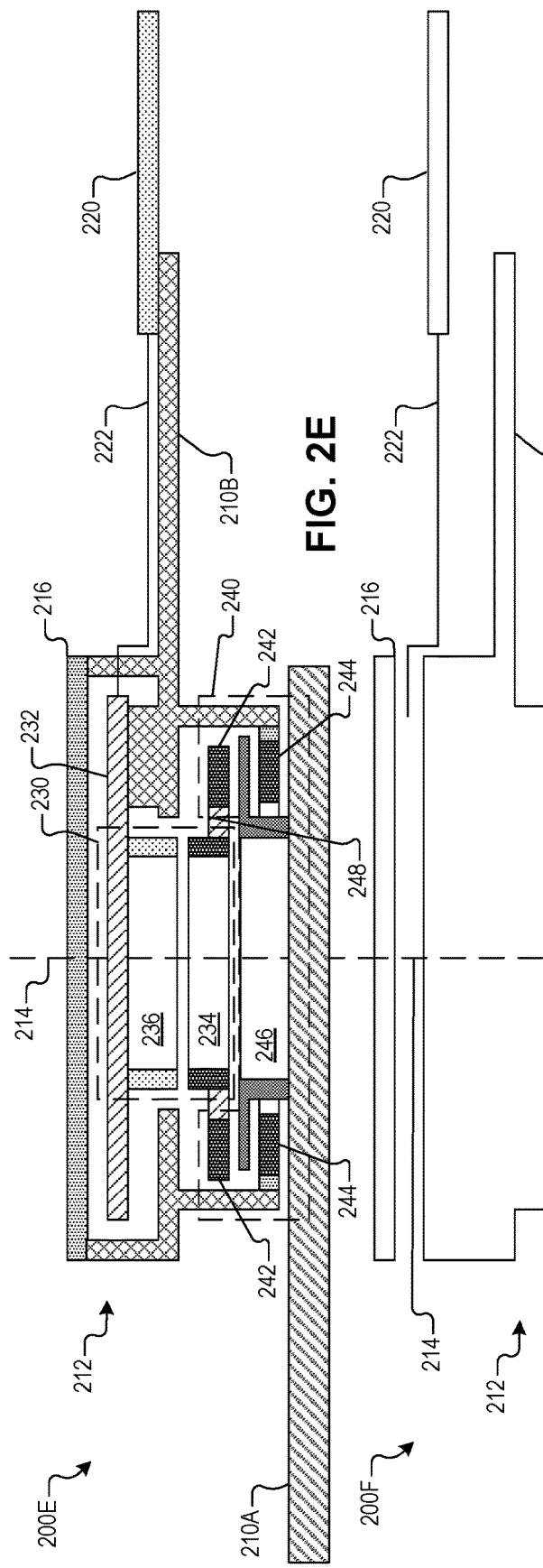
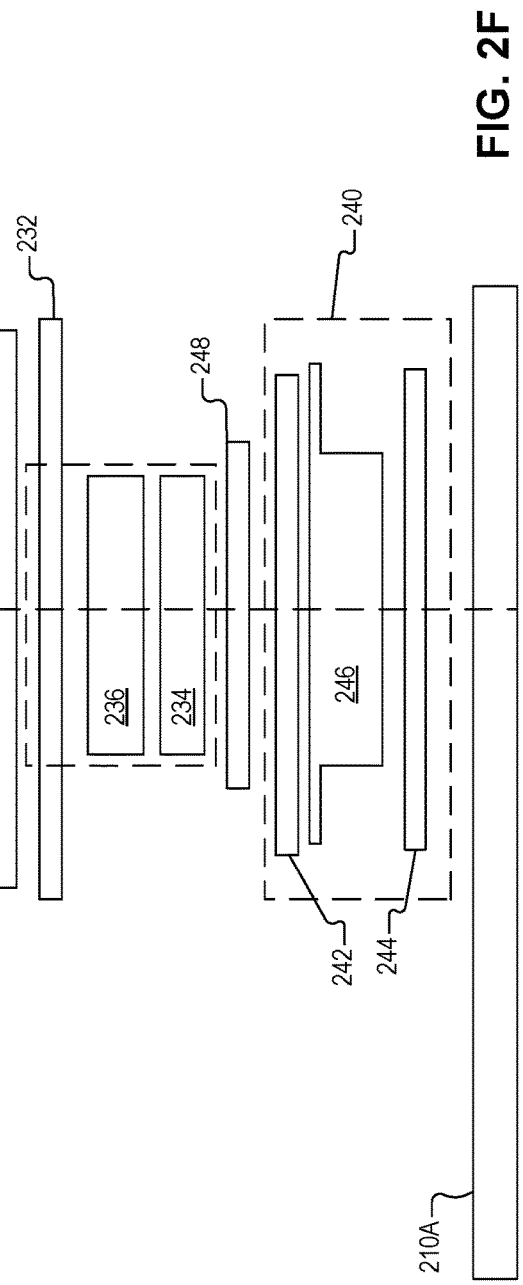

US 11,770,049 B2

GENERATING ELECTRIC POWER FOR A ROBOTIC END EFFECTOR

TECHNICAL FIELD

Embodiments of the present disclosure relate to generating electric power in manufacturing systems, such as substrate processing systems, and in particular to generating electric power for a robotic end effector.

BACKGROUND

In semiconductor processing and other electronics processing, objects, such as substrates, are transported between portions of the system by a robot device. Electric power is to be provided to one or more portions of the robot device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a robot device includes a first link and a second link coupled to the first link via an elbow. One or more of the first link or the second link rotates about an axis of the elbow. The robot device further includes a generator disposed in the elbow. The generator is configured to generate electrical power based on relative angular mechanical movement associated with the elbow. The robot device further includes an end effector configured to transport a substrate within a substrate processing system. The end effector is disposed at a distal end of the second link. The end effector is to receive the electrical power generated by the generator.

In another aspect of the disclosure, a power generator is configured to be disposed in an elbow of a robot device. The power generator includes permanent magnets configured to attach to a first link of the robot device. One or more of the first link or a second link of the robot device are to rotate about an axis of the elbow. The power generator further includes a printed circuit board (PCB) configured to couple to wires of an end effector disposed at a distal end of the second link. The power generator further includes a coils array disposed proximate the PCB and the permanent magnets. The power generator is configured to generate electrical power based on relative angular mechanical movement associated with the elbow. The end effector is to receive the electrical power via the wires.

In another aspect of the disclosure, a method includes generating, by a generator disposed in an elbow of a robot device, electrical power based on relative angular mechanical movement associated with the elbow. A first link of the robot device is coupled to a second link of the robot device via the elbow. One or more of the first link or the second link rotates about an axis of the elbow. The method further includes providing, via one or more wires, the electrical power to an end effector disposed at a distal end of the second link.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2A illustrates a cross-sectional view of a robot device that includes a generator, according to certain embodiments.

FIG. 2B illustrates an exploded view of a robot device that includes a generator, according to certain embodiments.

FIGS. 2C-F illustrate cross-sectional views of robot devices that include a transmission element, according to certain embodiments.

DETAILED DESCRIPTION OF EMBODIMENTS

Figure 1:
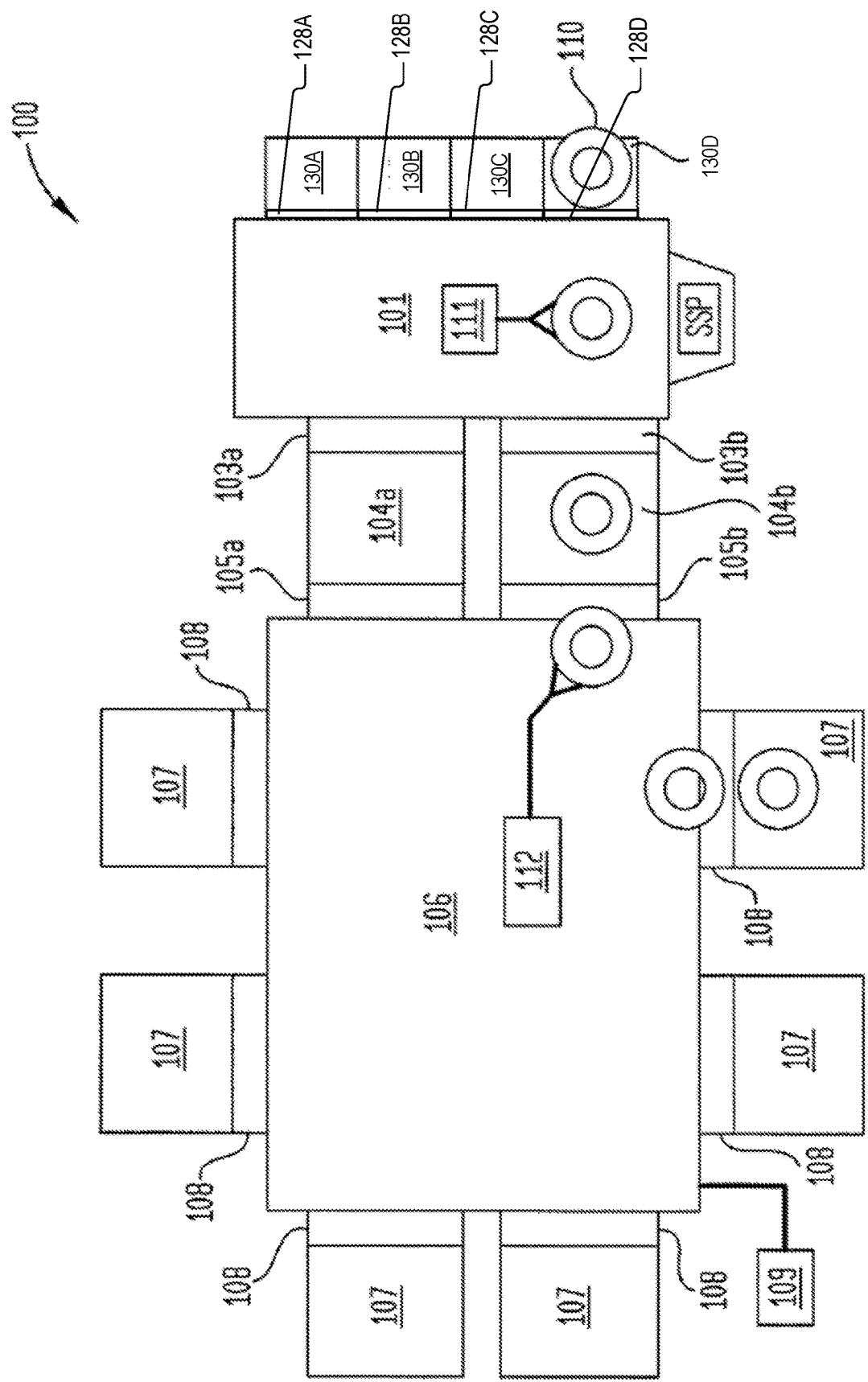
FIG. 1 illustrates a processing system, according to certain embodiments.

Embodiments described herein are related to generating electric power for a robotic end effector.

In semiconductor processing and other electronics processing, objects, such as substrates, are transported between portions of the system by a robot device. Electric power is to be provided to one or more portions of the robot device.

Some conventional systems route wires inside and/or outside of the robot device to provide electrical power to different portions of the robot device, such as the end effector (e.g., blade). To provide electrical power to the end effector, wires may be routed from the controller, through moving links (e.g., arms) using slip rings and feed throughs (e.g., structures through which wires are oriented), and to the end effector. As the wires and other electronics move in the conventional systems (e.g., undergo friction), particles are generated and outgassing occurs, which contaminate the substrate processing system and damage substrates. Running wires through moving links causes the wires to be twisted and eventually break, causing downtime, unplanned maintenance, and decreased yield of the conventional systems. The routed wires, slip rings, feed throughs, and other components used to provide electrical power to portions of the robot device cause the robot device to occupy more space and impose limitations on the robot device.

Some systems may use wireless power. A power source wired to a wireless transmitter is disposed at one location in the robot device and a wireless receiver wired to the end effector is disposed in another location in the robot device. The power source, wires, wireless transmitter, and wireless receiver cause the robot device to occupy more space and impose limitations on the robot device. The wires used cause particles to be generated and cause outgassing to occur. The wireless transmission of electrical power is subject to errors in transmission and which causes unplanned maintenance, downtime, and decreased yield.

Systems that use wired or wireless transmission of electrical power use electrical power and cause increased energy consumption of external energy sources by the substrate processing system.

The devices, systems, and methods disclosed herein provide generating of electric power for a robotic end effector. A robot device has multiple links (e.g., robot arms) and is disposed in a support processing system (e.g., transfer chamber, factory interface, etc.). A first link and second link are coupled to each other via an elbow. One or more of the first link or the second link rotate about an axis of the elbow. In some embodiments, an end effector configured to transport a support within the support processing system is disposed on a first distal end of the second link (e.g., upper arm). In some embodiments, a second distal end of the second link includes the elbow that is disposed above and is coupled to (e.g., rotatably attached to) the first link. A generator (e.g., power generator) is disposed in the elbow. The generator is configured to generate electrical power based on relative angular mechanical movement associated with the elbow. In some embodiments, the relative angular mechanical movement is one or more of first movement of the first link about the axis of the elbow (e.g., relative to the second link), second movement of the second link about the axis of the elbow (e.g., relative to the first link), and/or third movement of a transmission element (e.g., magnetic gear, mechanical gear, etc.) disposed in the elbow.

The end effector receives the electrical power generated by the generator. In some embodiments, the end effector uses the electrical power to power one or more of a communication component of the end effector, a plunger of the end effector, a heater of the end effector, one or more sensors of the end effector, and/or the like.

In some embodiments, the generator includes a printed circuit board (PCB) coupled to wires of the end effector, permanent magnets disposed between the PCB and the first link, and a coils array disposed proximate the PCB and the permanent magnets.

In some embodiments, a transmission element is located in the elbow proximate the generator. The transmission element magnifies transmission of rotation velocity based on the relative angular mechanical movement to increase power generation. In some embodiments, the transmission element is a magnetic gear that includes a high velocity rotor attached to the permanent magnets of the generator, a low velocity rotor attached to an inner sidewall of the elbow, and a flux modulator attached to the first link, wherein at least a portion of the flux modulator is disposed between the high velocity rotor and the low velocity rotor.

The devices, systems, and methods disclosed herein have advantages over conventional solutions. The present disclosure avoids routing of wires, use of slip rings, and use of feed throughs associated with conventional systems, resulting in less friction, particle generation, outgassing, contamination, and damage. The present disclosure avoids additional components of conventional systems, such as wires routed from a controller to the end effector, slip rings, feed throughs, wireless receivers, and/or wireless transmitters, resulting in less space being occupied and less limitations on the robot device. The present disclosure generates electrical power and causes a substrate processing system to have less energy consumption of external energy sources compared with conventional systems.

Although some embodiments of the present disclosure refer to providing electrical power to an end effector of the robot device, in some embodiments, the electrical power is provided to a component other than an end effector (e.g., provided to another portion of the robot device). Although some embodiments of the present disclosure refer to a robot device disposed in a substrate processing system, in some embodiments, the electrical power is generated and/or provided by a device that is not a robot device disposed in a substrate processing system, such as a robot device that transports enclosure systems (e.g., front opening unified pod (FOUP)) to the substrate processing system, links of a robot device not associated with a substrate processing system, and/or the like. In some embodiments, the robot device what provides electrical power to an end effector (or other component of the robot device) is a factory interface robot (e.g., a robot configured to operate at or around atmospheric pressures). In some embodiments, the robot device what provides electrical power to an end effector (or other component of the robot device) is a transfer chamber robot (e.g., a robot configured to operate at or around vacuum pressures).

FIG. 1 illustrates a processing system 100 (e.g., wafer processing system, substrate processing system, semiconductor processing system) according to certain embodiments. The processing system 100 includes a factory interface 101 and load ports 128 (e.g., load ports 128A-D). In some embodiments, the load ports 128A-D are directly mounted to (e.g., seal against) the factory interface 101. Enclosure systems 130 (e.g., cassette, front opening unified pod (FOUP), process kit enclosure system, or the like) are configured to removably couple (e.g., dock) to the load ports 128A-D. Referring to FIG. 1, enclosure system 130A is coupled to load port 128A, enclosure system 130B is coupled to load port 128B, enclosure system 130C is coupled to load port 128C, and enclosure system 130D is coupled to load port 128D. In some embodiments, one or more enclosure systems 130 are coupled to the load ports 128 for transferring wafers and/or other substrates into and out of the processing system 100. Each of the enclosure systems 130 seal against a respective load port 128. In some embodiments, a first enclosure system 130A is docked to a load port 128A (e.g., for replacing used process kit rings). Once such operation or operations are performed, the first enclosure system 130A is then undocked from the load port 128A, and then a second enclosure system 130 (e.g., a FOUP containing wafers) is docked to the same load port 128A. In some embodiments, an enclosure system 130 (e.g., enclosure system 130A) is an enclosure system with shelves for aligning carriers and/or process kit rings.

In some embodiments, a load port 128 includes a front interface that forms a vertical opening (or a substantially vertical opening). The load port 128 additionally includes a horizontal surface for supporting an enclosure system 130 (e.g., cassette, process kit enclosure system). Each enclosure system 130 (e.g., FOUP of wafers, process kit enclosure system) has a front interface that forms a vertical opening. The front interface of the enclosure system 130 is sized to interface with (e.g., seal to) the front interface of the load port 128 (e.g., the vertical opening of the enclosure system 130 is approximately the same size as the vertical opening of the load port 128). The enclosure system 130 is placed on the horizontal surface of the load port 128 and the vertical opening of the enclosure system 130 aligns with the vertical opening of the load port 128. The front interface of the enclosure system 130 interconnects with (e.g., clamp to, be secured to, be sealed to) the front interface of the load port 128. A bottom plate (e.g., base plate) of the enclosure system 130 has features (e.g., load features, such as recesses or receptacles, that engage with load port kinematic pin features, a load port feature for pin clearance, and/or an enclosure system docking tray latch clamping feature) that engage with the horizontal surface of the load port 128. The same load ports 128 that are used for different types of enclosure systems 130 (e.g., process kit enclosure system, cassettes that contain wafers, etc.).

In some embodiments, the enclosure system 130 (e.g., process kit enclosure system) includes one or more items of content 110 (e.g., one or more of a process kit ring, an empty process kit ring carrier, a process kit ring disposed on a process kit ring carrier, a placement validation wafer, etc.). In some examples, the enclosure system 130 is coupled to the factory interface 101 (e.g., via load port 128) to enable automated transfer of a process kit ring on a process kit ring carrier into the processing system 100 for replacement of a used process kit ring.

In some embodiments, the processing system 100 also includes first vacuum ports 103a, 103b coupling the factory interface 101 to respective degassing chambers 104a, 104b. Second vacuum ports 105a, 105b are coupled to respective degassing chambers 104a, 104b and disposed between the degassing chambers 104a, 104b and a transfer chamber 106 to facilitate transfer of wafers and content 110 (e.g., process kit rings) into the transfer chamber 106. In some embodiments, a processing system 100 includes and/or uses one or more degassing chambers 104 and a corresponding number of vacuum ports 103, 105 (e.g., a processing system 100 includes a single degassing chamber 104, a single first vacuum port 103, and a single second vacuum port 105). The transfer chamber 106 includes a plurality of processing chambers 107 (e.g., four processing chambers 107, six processing chambers 107, etc.) disposed therearound and coupled thereto. The processing chambers 107 are coupled to the transfer chamber 106 through respective ports 108, such as slit valves or the like. In some embodiments, the factory interface 101 is at a higher pressure (e.g., atmospheric pressure) and the transfer chamber 106 is at a lower pressure (e.g., vacuum). Each degassing chamber 104 (e.g., loadlock, pressure chamber) has a first door (e.g., first vacuum port 103) to seal the degassing chamber 104 from the factory interface 101 and a second door (e.g., second vacuum port 105) to seal the degassing chamber 104 from the transfer chamber 106. Content is to be transferred from the factory interface 101 into a degassing chamber 104 while the first door is open and the second door is closed, the first door is to close, the pressure in the degassing chamber 104 is to be reduced to match the transfer chamber 106, the second door is to open, and the content is to be transferred out of the degassing chamber 104. A local center finding (LCF) device is to be used to align the content in the transfer chamber 106 (e.g., before entering a processing chamber 107, after leaving the processing chamber 107).

In some embodiments, the processing chambers 107 includes or more of etch chambers, deposition chambers (including atomic layer deposition, chemical vapor deposition, physical vapor deposition, or plasma enhanced versions thereof), anneal chambers, or the like.

Factory interface 101 includes a factory interface robot 111 (e.g., robot device). Factory interface robot 111 includes a robot arm (e.g., including links), such as a selective compliance assembly robot arm (SCARA) robot. Examples of a SCARA robot include a 2 link SCARA robot, a 3 link SCARA robot, a 4 link SCARA robot, and so on. The factory interface robot 111 includes an end effector on an end of the robot arm. The end effector is configured to pick up and handle specific objects, such as wafers. Alternatively, or additionally, the end effector is configured to handle objects such as a carrier and/or process kit rings (edge rings). The robot arm has one or more links or members (e.g., wrist member, upper arm member, forearm member, etc.) that are configured to be moved to move the end effector in different orientations and to different locations. The factory interface robot 111 is configured to transfer objects between enclosure systems 130 (e.g., cassettes, FOUPs) and degassing chambers 104a, 104b (or load ports).

Transfer chamber 106 includes a transfer chamber robot 112 (e.g., robot device). Transfer chamber robot 112 includes a robot arm (e.g., including links) with an end effector at an end of the robot arm. The end effector is configured to handle particular objects, such as wafers. In some embodiments, the transfer chamber robot 112 is a SCARA robot, but has fewer links and/or fewer degrees of freedom than the factory interface robot 111 in some embodiments.

In some embodiments, one or more robot devices (e.g., factory interface robot 111, transfer chamber robot 112) of processing system 100 includes at least two links joined by an elbow, where the at least two links rotate about an axis of the elbow. The elbow includes a generator that generates electrical power based on rotation of one or more links about the axis and/or a transmission element (e.g., mechanical gear, magnetic gear, etc.) about the axis.

A controller 109 controls various aspects of the processing system 100. The controller 109 is and/or includes a computing device such as a personal computer, a server computer, a programmable logic controller (PLC), a microcontroller, and so on. The controller 109 includes one or more processing devices, which, in some embodiments, are general-purpose processing devices such as a microprocessor, central processing unit, or the like. More particularly, in some embodiments, the processing device is a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device is one or more special-purpose processing devices such as an application specific integrated circuit (ASIC), a field programmable gate array (FPGA), a digital signal processor (DSP), network processor, or the like. In some embodiments, the controller 109 includes a data storage device (e.g., one or more disk drives and/or solid state drives), a main memory, a static memory, a network interface, and/or other components. In some embodiments, the controller 109 executes instructions to perform any one or more of the methods or processes described herein. The instructions are stored on a computer readable storage medium, which include one or more of the main memory, static memory, secondary storage and/or processing device (during execution of the instructions). The controller 109 receives signals from and sends controls to factory interface robot 111 and wafer transfer chamber robot 112 in some embodiments.

FIG. 1 schematically illustrates transfer of content 110 (e.g., a process kit ring coupled to a process kit ring carrier) into a processing chamber 107. According to one aspect of the disclosure, content 110 is removed from an enclosure system 130 via factory interface robot 111 located in the factory interface 101. The factory interface robot 111 transfers the content 110 through one of the first vacuum ports 103a, 103b and into a respective degassing chamber 104a, 104b. A transfer chamber robot 112 located in the transfer chamber 106 removes the content 110 from one of the degassing chambers 104a, 104b through a second vacuum port 105a or 105b. The transfer chamber robot 112 moves the content 110 into the transfer chamber 106, where the content 110 is transferred to a processing chamber 107 though a respective port 108. While not shown for clarity in FIG. 1, transfer of the content 110 includes transfer of a process kit ring disposed on a process kit ring carrier, transfer of an empty process kit ring carrier, transfer of a placement validation wafer, etc.

FIG. 1 illustrates one example of transfer of content 110, however, other examples are also contemplated. In some examples, it is contemplated that the enclosure system 130 is coupled to the transfer chamber 106 (e.g., via a load port mounted to the transfer chamber 106). From the transfer chamber 106, the content 110 is to be loaded into a processing chamber 107 by the transfer chamber robot 112. Additionally, in some embodiments, content 110 is loaded in a substrate support pedestal (SSP). In some embodiments, an additional SSP is positioned in communication with the factory interface 101 opposite the illustrated SSP. Processed content 110 (e.g., a used process kit ring) is to be removed from the processing system 100 in reverse of any manner described herein. When utilizing multiple enclosure systems 130 or a combination of enclosure system 130 and SSP, in some embodiments, one SSP or enclosure system 130 is to be used for unprocessed content 110 (e.g., new process kit rings), while another SSP or enclosure system 130 is to be used for receiving processed content 110 (e.g., used process kit rings).

The processing system 100 includes chambers, such as factory interface 101 (e.g., equipment front end module (EFEM)), transfer chamber 106, and adjacent chambers (e.g., load port 128, enclosure system 130, SSP, degassing chamber 104 such as a loadlock, processing chambers 107, or the like) that are adjacent to the factory interface 101 and/or the transfer chamber 106. One or more of the chambers is sealed (e.g., each of the chambers is sealed). The adjacent chambers are sealed to the factory interface 101 and/or the transfer chamber 106. In some embodiments, inert gas (e.g., one or more of nitrogen, argon, neon, helium, krypton, or xenon) is provided into one or more of the chambers (e.g., the factory interface 101, transfer chamber 106, and/or adjacent chambers) to provide one or more inert environments. In some examples, the factory interface 101 is an inert EFEM that maintains the inert environment (e.g., inert EFEM minienvironment) within the factory interface 101 so that users do not need to enter the factory interface 101 (e.g., the processing system 100 is configured for no manual access within the factory interface 101).

In some embodiments, gas flow (e.g., providing inert gas, providing nitrogen, exhausting gas to provide a vacuum environment, etc.) is provided into and/or from one or more chambers (e.g., factory interface 101, transfer chamber 106, adjacent chambers, etc.) of the processing system 100.

In some embodiments, the gas flow is greater than leakage through the one or more chambers to maintain a positive pressure within the one or more chambers. In some embodiments, the exhausted gas flow is greater than leakage through the one or more chambers to maintain a negative pressure within the one or more chambers.

In some embodiments, the inert gas within the factory interface 101 is recirculated. In some embodiments, a portion of the inert gas is exhausted. In some embodiments, the gas flow of non-recirculated gas into the one or more chambers is greater than the exhausted gas flow and the gas leakage to maintain a positive pressure of inert gas within the one or more chambers. In some embodiments, exhausted gas flow out of the one or more chambers is greater than gas leakage (e.g., and gas flow) into the one or more chambers to maintain a negative pressure (e.g., vacuum environment) within the one or more chambers.

In some embodiments, the one or more chambers are coupled to one or more valves and/or pumps to provide the gas flow into and/or out of the one or more chambers. A processing device (e.g., of controller 109) controls the gas flow into and out of the one or more chambers. In some embodiments, the processing device receives sensor data from one or more sensors (e.g., oxygen sensor, moisture sensor, motion sensor, door actuation sensor, temperature sensor, pressure sensor, etc.) and determines, based on the sensor data, the flow rate of inert gas flowing into and/or flow rate of gas flowing out of the one or more chambers.

Figure 2C:
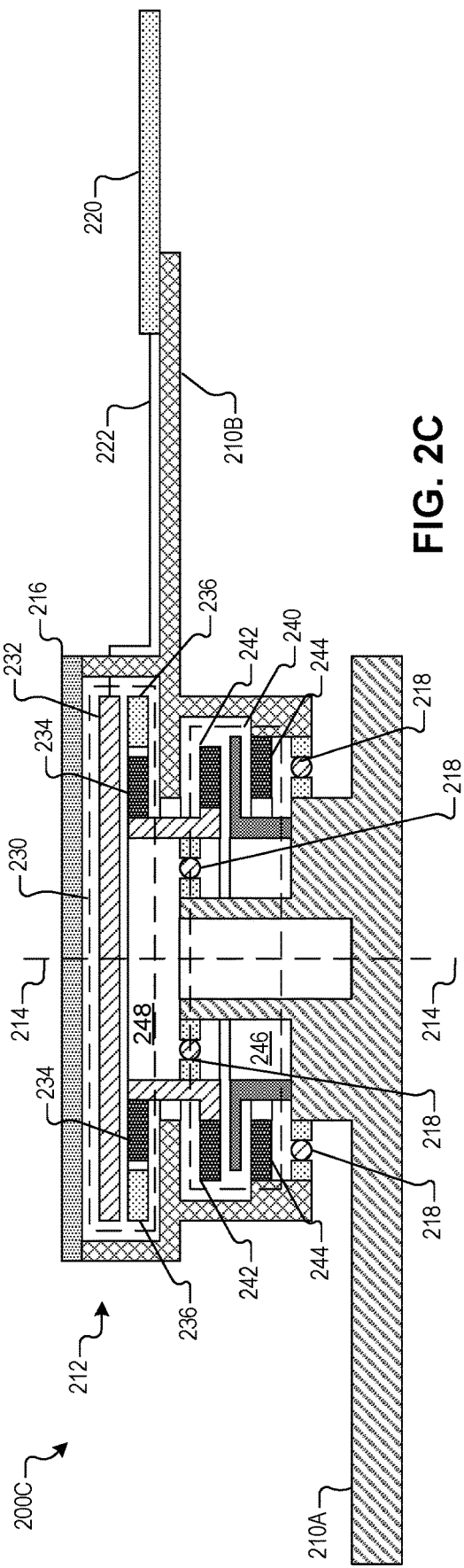

FIGS. 2A-B illustrate views of robot devices 200A-B that include a generator 230 (e.g., power generator, electric power generator), according to certain embodiments. FIGS. 2C-F illustrate views of robot devices 200C-F that include a generator 230 and a transmission element 240, according to certain embodiments.

Figure 2D:
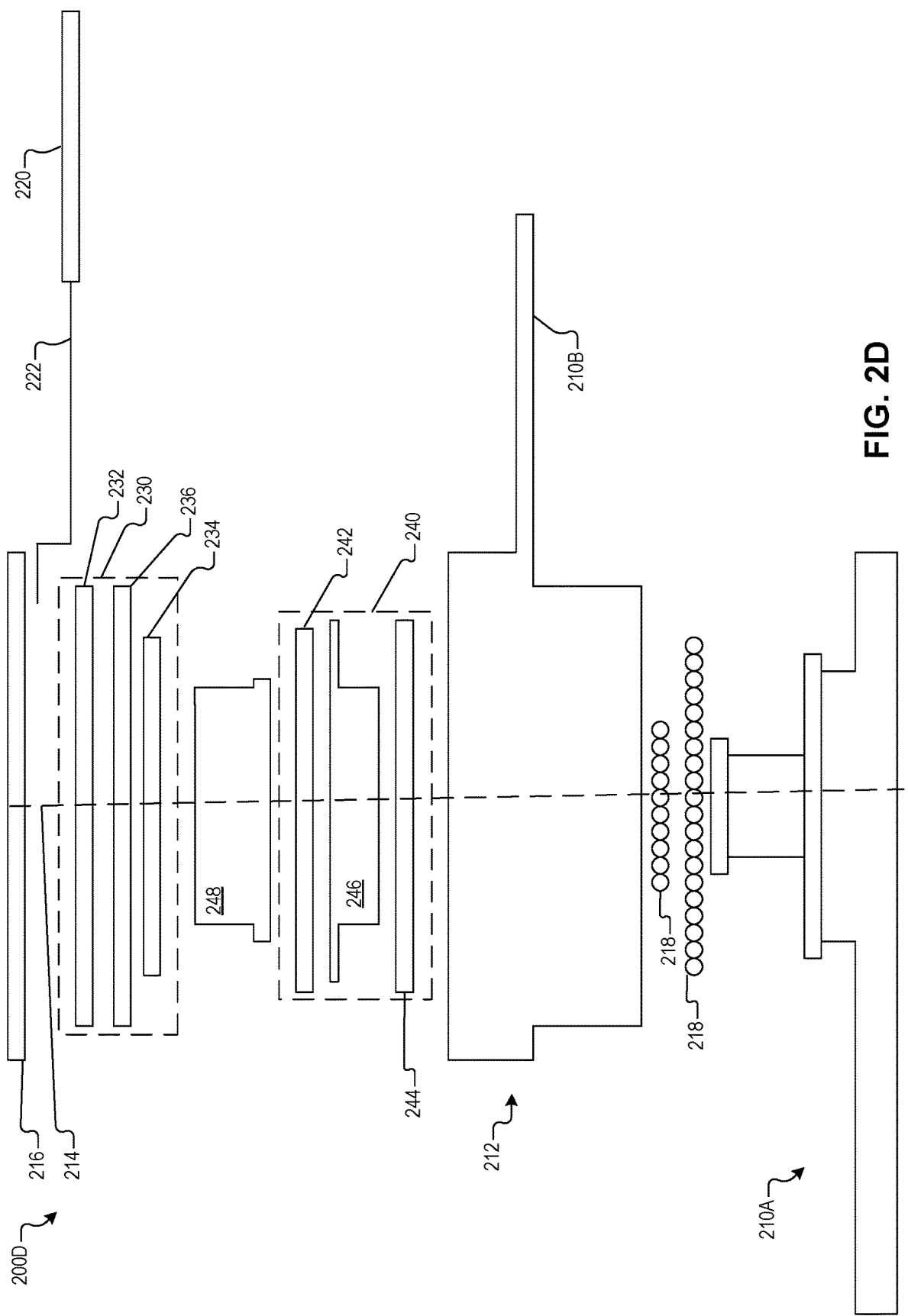

FIGS. 2A, 2C, and 2E illustrate cross-sectional views of robot devices 200A, 200C, and 200E, according to certain embodiments. FIGS. 2B, 2D, and 2F illustrate exploded views of robot devices 200B, 200D, and, according to certain embodiments. In some embodiments, one or more features of FIGS. 2A, 2B, 2C, 2D, 2E, and/or 2F that include similar reference numbers as other features of any of FIGS. 1, 2A, 2B, 2C, 2D, 2E, and/or 2F include similar or the same function and/or structure. In some embodiments, one or more of robot devices 200A-F are factory interface robot 111 of FIG. 1 and/or transfer chamber robot 112 of FIG. 1. In some embodiments, robot devices 200A-B are the same robot device. In some embodiments, robot devices 200C-D are the same robot device. In some embodiments, robot devices 200E-F are the same robot device.

A robot device 200 includes two or more links 210 (e.g., arms) and a generator 230. As one link 210 moves relative to an adjacent link 210 in the same robot device 200 (e.g., robot arm), the generator 230 generates electricity. Links 210 are coupled to each other via an elbow 212 that has an axis 214. An elbow 212 is a rotation joint (e.g., elbow joint) that joins links 210. The links 210 rotate about the axis 214 of the elbow 212. In some embodiments, the elbow 212 is part of one of the links 210B and the other link 210A couples (e.g., rotatably couples) to the elbow 212 (e.g., an outer surface of the other link 210A couples to an inner surface of the elbow 212 via bearings 218). In some embodiments, the generator 230 is attached to a link 210B that is the closest link to the power destination (e.g., the generator 230 is disposed in the elbow 212 that is the closest elbow 212 to the power destination). In some embodiments, the power destination is an end effector 220 (e.g., robotic end effector). As one or more of the links 210 of the robot device 200 (e.g., one or more of the links 210 coupled to the elbow 212) move (e.g., change angles between links 210), the generator 230 generates electricity (e.g., in-situ generating of electrical power utilizing relative angular mechanical movement in a robotic elbow).

In some embodiments, the robot device 200 does not have a transmission element 240 (e.g., a configuration without a gearing generator). In some embodiments, the movements of the one or more links 210 are small and not continuous. In some embodiments, a transmission element 240 (e.g., magnetic gear, speed increasing gear, transmission element 240 using frictionless magnetic principle) is used to increase the electrical power generated by the generator 230. In some embodiments, the transmission element 240 (e.g., magnetic gear) is one or more of frictionless (or has low friction), runs on standard suitable for vacuum ball bearings, is highly efficient, and increases rotary speed from about 10 to about 50 times. In some embodiments the efficiency of the transmission element 240 is from about 95% to about 99.9%. In some embodiments, the transmission element 240 is concentric, eccentric, or another configuration.

Referring to FIGS. 2A-F, a robot device 200 includes a link 210A (e.g., lower link, lower arm) and a link 210B (e.g., upper link, upper arm) coupled to the link 210A via an elbow 212. Link 210A and/or link 210B rotate about the axis 214 of the elbow 212. In some embodiments, the elbow 212 includes an upper structure 216 (e.g., lid) that is configured to removably attach to (e.g., seal to) the sidewalls of the elbow 212.

An end effector 220 configured to transport a substrate within a substrate processing system (e.g., processing system 100 of FIG. 1A) is disposed at a distal end of the link 210B, the end effector 220 includes (e.g., is coupled to) wires 222 (e.g., wires configured to one or more of transmit electrical power to the end effector 220, ground the end effector 220, provide control signals to the end effector 220, receive sensor data from the end effector, etc.). In some embodiments, the end effector 220 includes one or more of a communication component (e.g., for wired or wireless communication), a plunger (e.g., to secure an object between the plunger and one or more protrusions (e.g., fangs), a heater (e.g., to heat the end effector and/or an object secured by the end effector), one or more sensors, a light emitter and a light receiver (e.g., for locating objects, for auto-teaching, etc.), and/or the like.

In some embodiments, the generator 230 generates at least 0.5 Watts to cover power usage of one or more of a communication system of the end effector 220 (e.g., an enterprise service bus (ESB)), wireless component of the end effector 220 (e.g., for communication via Bluetooth® communication), and/or a power commutator of the end effector 220. In some embodiments, the generator 230 generates at least 7 Watts (e.g., for a heating element of an end effector 220). In some embodiments, the generator 230 generates at least 10 Watts (e.g., for a heating element and other components of an end effector 220)

In some embodiments, link 210B (e.g., elbow 212) is coupled to the first link via one or more bearings 218 (e.g., machine element that constrains relative motion to one or more motions, reduces friction between moving parts, support bearings, metal bearings, ceramic bearings, etc.) that provides for rotation (e.g., of the link 210A, link 210B, and/or elbow 212) around a fixed axis 214. In some embodiments, the bearings 218 are ball bearings.

A generator 230 is disposed in the elbow 212. The generator 230 includes a PCB 232 (e.g., and associated electronics disposed on the PCB 232), permanent magnets 234, and a coils array 236.

In some embodiments, the PCB 232 includes one or more of a processing device (e.g., controller, processor), memory, a communication module (e.g., a wireless receiver, a wireless transmitter, etc.), a power storage component (e.g., battery, capacitor, capacitor array, etc.). In some embodiments, the coils of the coils array 236 are mounted to the PCB 232 and the PCB 232 is fixed to link 210B (e.g., attached to an inner surface of the elbow 212). In some embodiments, the power storage component is a backup power source (e.g., to use responsive to low relative angular mechanical movement associated with the elbow 212). In some embodiments, the power storage component smooths out the electrical current (e.g., responsive to the relative angular mechanical movement not being continuous).

In some embodiments, the permanent magnet 234 has a hollow cylindrical shape (e.g., ring shape). In some embodiments, the coils array 236 has a hollow cylindrical shape (e.g., ring shape). In some embodiments, at least a portion of the permanent magnets is arranged in a Halbach array. A Halbach array is an arrangement of permanent magnets that augments the magnetic field on one side of the array while canceling the filed to near zero on the other side by having a spatially rotating pattern of magnetization. The permanent magnets 234 arranged in a Halbach array increases the magnetic flux and the generated electrical power.

The coils array 236 has a thickness between an outer sidewall and an inner sidewall and has a height from a lower surface to an upper surface. In some embodiments, height of the coils array 236 is greater than the thickness of the coils array 236 (e.g., see FIGS. 2A and 2E). In some embodiments, thickness of the coils array 236 is greater than the height of the coils array 236 (e.g., see FIG. 2C), where inner volume (e.g., width) of the elbow 212 is used for the coils array 236 (e.g., to have a shorter height of the inner volume of the elbow 212).

One or more of link 210A and/or link 210B is controlled (e.g., by controller 109 of FIG. 1) to rotate about axis 214. Responsive to one or more of link 210A and/or link 210B rotating about the axis 214 (e.g., relative angular mechanical movement of one or more of the links 210A-B relative to each other), there is relative motion between the permanent magnet 234 and the coils array 236. The relative angular mechanical movement between the permanent magnet 234 and the coils array 236 causes electrical energy to be generated. In some embodiments, the electrical energy is stored in a power storage component (e.g., disposed on the PCB 232). In some embodiments the power storage component is a capacitor or a capacitor array. The PCB 232 is coupled to the end effector 220 via wires 222. The PCB 232 and/or power storage component provides the electrical power to the end effector 220 via the wires.

Referring to FIGS. 2A-B, in some embodiments, permanent magnets 234 are attached to link 210A. In some embodiments, PCB 232 is attached to an inner surface of elbow 212. In some embodiments, coils array 236 is attached to PCB 232. An inner surface of elbow 212 is coupled to link 210A via one or more bearings 218.

Referring to FIGS. 2C-F, in some embodiments, a transmission element 240 is disposed in elbow 212 proximate generator 230. In some embodiments, the transmission element 240 magnifies transmission of rotation velocity based on the relative angular mechanical movement to increase power generation. In some embodiments, the relative angular mechanical movement includes one or more of rotation of link 210A about the axis 214 of elbow 212, rotation of link 210B about the axis 214 of elbow 212, and/or rotation of transmission element 240 about the axis 214 of elbow 212.

In some embodiments, the transmission element 240 includes mechanical gears.

In some embodiments, the transmission element 240 includes a magnetic gear. The magnetic gear includes a high velocity rotor 242 (e.g., a permanent magnet) attached to the permanent magnets 234 of the generator 230 (e.g., high velocity rotor is free rotating via bearings 218), a low velocity rotor 244 (e.g., a permanent magnet) attached to an inner sidewall of the elbow 212 (e.g., low velocity rotor 244 is attached to link 210B), and a flux modulator 246 attached to the link 210A. In some embodiments, the high velocity rotor 242 is a permanent magnet that has less poles (e.g., about 4 poles) than the low velocity rotor 244 (e.g., that has about 40 poles). In some embodiments, the low velocity rotor 244 is a permanent magnet that has about 10 times as many poles as the high velocity rotor 242.

In some embodiments, the coils array 236 is attached to PCB 232. Permanent magnets 234 are attached to high velocity rotor 242 via structure 248 (e.g., attaching structure, adhesive structure, joining structure, etc.).

In some embodiments, the coils array 236 (e.g., attached to the PCB 232 that is attached to the elbow 212 of the link 210B), the low velocity rotor 244 (e.g., attached to the elbow 212 of the link 210B) are attached to the link 210B, and the flux modulator 246 is attached to the link 210A. The permanent magnets 234 and high velocity rotor 242 are not attached to either of the links 210A-B. In some embodiments, responsive to one or more of the links 210A-B rotating about the axis 214 of the elbow 212, there is relative rotation between components attached to the link 210A (e.g., flux modulator 246) and components attached to link 210B (e.g., coils array 236 and low velocity rotor 244). This relative motion causes the free-rotating components (e.g., permanent magnets 234 and high velocity rotor 242) to rotate around the axis 214 at a higher velocity (e.g., compared to a generator 230 without a transmission element 240) and cause the generator 230 to generate a greater amount of electrical power (e.g., compared to a generator 230 without a transmission element).

Figure 3:
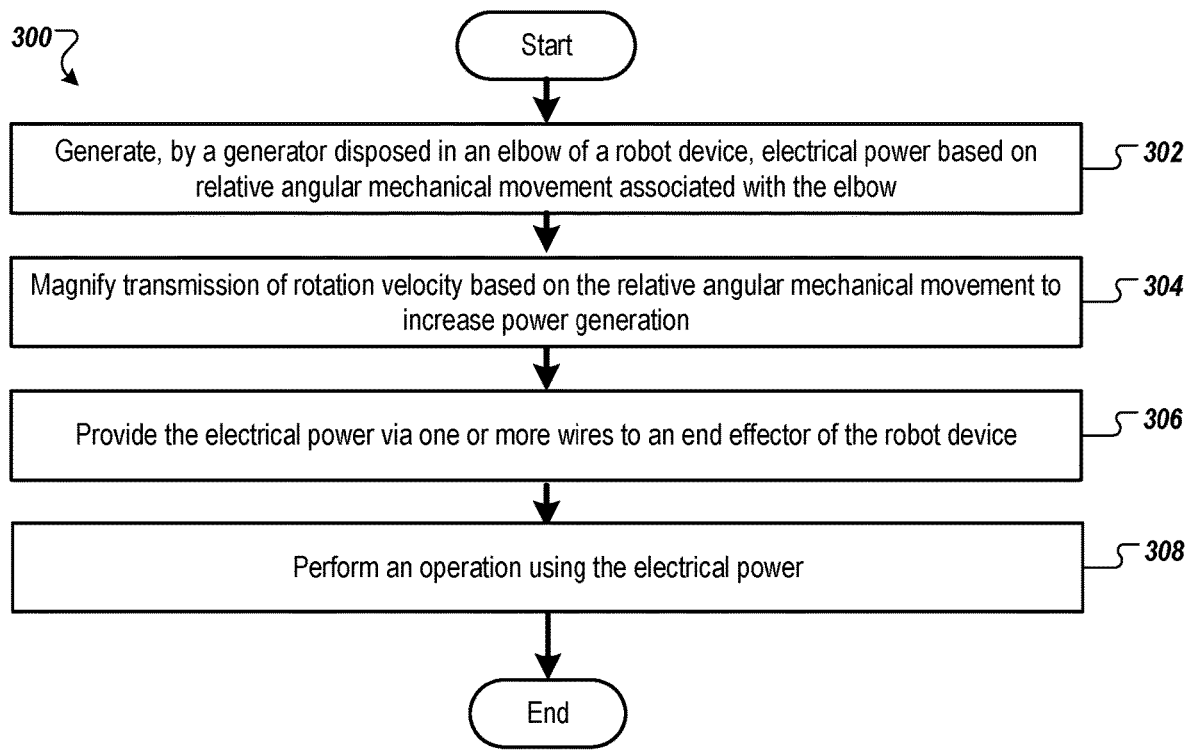
FIG. 3 illustrates a method of generating electric power for a robotic end effector, according to certain embodiments.

FIG. 3 illustrates a method 300 of generating electric power for a robotic end effector, according to certain embodiments. One or more operations of method 300 is performed by one or more of a robot device (e.g., factory interface robot 111, transfer chamber robot 112) and/or generator (e.g., generator 230 of FIGS. 2A-F, power generator). In some embodiments, the same component of the robot device is used for multiple operations and/or different operations are performed by different components of the robot device. In some embodiments, the robot device is controlled by processing logic (e.g., PCB 232 of FIGS. 2A-F, controller 109 of FIG. 1) that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 300 is controlled by a controller (e.g., controller 109 of FIG. 1, controller 409 of FIG. 4B). In some embodiments, method 300 is controlled by a server device (e.g., in communication with PCB 232 of FIGS. 2A-F and/or controller 109 of FIG. 1). In some embodiments, a non-transitory storage medium stores instructions that when executed by a processing device (e.g., of controller 109 of FIG. 1, of PCB 232 of FIGS. 2A-F, of a server device, etc.) cause the processing device to perform method 300.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations (e.g., block 304) can be omitted in various embodiments. Thus, not all operations are used in every embodiment.

Referring to method 300 of FIG. 3, at block 302, a generator disposed in an elbow of a robot device generates electrical power based on relative angular mechanical movement associated with the elbow. A first link of the robot device is coupled to a second link of the robot device via the elbow. One or more of the first link or the second link rotates about an axis of the elbow. The relative angular mechanical movement includes one or more of rotation of a first link about the axis of the elbow, rotation of a second link about the axis of the elbow, and/or rotation of at least a portion of the transmission element about the axis of the elbow.

In some embodiments, at block 304, a transmission element disposed in the elbow magnifies transmission of rotation velocity based on the relative angular mechanical movement to increase power generation. The transmission element includes a high velocity rotor (e.g., magnets with a lower amount of poles), low velocity rotor (e.g., magnets with a higher amount of poles), and a flux modulator disposed between the magnets.

At block 306, the electrical power is provided via one or more wires to an end effector disposed at a distal end of the second link. In some embodiments, the electrical power is provided to one or more components of the end effector and/or other than the end effector.

At block 308, the end effector uses the electrical power to perform an operation. In some embodiments, the operation includes one or more of communicating data (e.g., via a wireless connection or a wired connection) using a communication component of the end effector, securing an object between a plunger of the end effector and one or more protrusions (e.g., fangs) of the end effector by actuating the plunger, heating one or more of the end effector and/or an object disposed on the end effector via a heater of the end effector, obtaining sensor data via one or more sensors of the end effector, determining a location of an object (e.g., an autoteach operation) by using a light emitter and a light receiver of the end effector, and/or the like.

Examples described herein also relate to an apparatus for performing the methods described herein. In some embodiments, this apparatus is specially constructed for performing the methods described herein, or includes a general purpose computer system selectively programmed by a computer program stored in the computer system. In some embodiments, the computer program is stored in a computer-readable tangible storage medium.

The methods and illustrative examples described herein are not inherently related to any particular computer or other apparatus. In some embodiments, the various general purpose systems are used in accordance with the teachings described herein, or a more specialized apparatus is constructed to perform methods described herein and/or each of their individual functions, routines, subroutines, or operations. Examples of the structure for a variety of these systems are set forth in the description above.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure are practiced without these specific details. In other instances, well-known components or methods are not described in detail or are presented in simple block diagram format in order to avoid unnecessarily obscuring the present disclosure. Thus, the specific details set forth are merely exemplary. Particular implementations vary from these exemplary details and are still contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

The terms "over," "under," "between," "disposed on," and "on" as used herein refer to a relative position of one material layer or component with respect to other layers or components. In some examples, one layer disposed on, over, or under another layer is directly in contact with the other layer or has one or more intervening layers. In some examples, one layer disposed between two layers is directly in contact with the two layers or has one or more intervening layers. Similarly, in some examples, one feature disposed between two features is in direct contact with the adjacent features or has one or more intervening layers.

Although the operations of the methods herein are shown and described in a particular order, in some embodiments, the order of operations of each method is altered so that certain operations are performed in an inverse order so that certain operations are performed, at least in part, concurrently with other operations. In another embodiment, instructions or sub-operations of distinct operations are in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A robot device comprising:
   a first link;
   a second link coupled to the first link via an elbow, wherein one or more of the first link or the second link rotates about an axis of the elbow;
   a generator disposed in the elbow, wherein the generator is configured to generate electrical power based on relative angular mechanical movement associated with the elbow; and
   an end effector configured to transport a substrate within a substrate processing system, the end effector being disposed at a distal end of the second link, wherein the end effector is to receive the electrical power generated by the generator.

2. The robot device of claim 1, wherein the generator comprises:
   a printed circuit board (PCB) coupled to wires of the end effector;
   permanent magnets disposed between the PCB and the first link; and
   a coils array disposed proximate the PCB and the permanent magnets.

3. The robot device of claim 2, wherein at least a portion of the permanent magnets is arranged in a Halbach array.

4. The robot device of claim 1 further comprising a transmission element disposed in the elbow, wherein the transmission element magnifies transmission of rotation velocity based on the relative angular mechanical movement to increase power generation.

5. The robot device of claim 4, wherein the relative angular mechanical movement is associated with one or more of:
   first rotation of the first link about the axis of the elbow;
   second rotation of the second link about the axis of the elbow; or
   third rotation of the transmission element about the axis of the elbow.

6. The robot device of claim 4, wherein the transmission element comprises a magnetic gear comprising:
   a high velocity rotor attached to permanent magnets of the generator;
   a low velocity rotor attached to an inner sidewall of the elbow; and
   a flux modulator attached to the first link, wherein at least a portion of the flux modulator is disposed between the high velocity rotor and the low velocity rotor.

7. The robot device of claim 1, wherein the second link comprises the elbow, wherein the elbow is coupled to the first link via bearings.

8. The robot device of claim 1, wherein the electrical power is to be used by one or more of:
   a communication component of the end effector;
   a plunger of the end effector;
   a heater of the end effector; or
   one or more sensors of the end effector.

9. The robot device of claim 1 further comprising a power storage component to receive the electrical power from the generator and to provide the electrical power to the end effector.

10. A power generator configured to be disposed in an elbow of a robot device, wherein the power generator comprises:
    permanent magnets configured to attach to a first link of the robot device, wherein one or more of the first link or a second link of the robot device are to rotate about an axis of the elbow;
    a printed circuit board (PCB) configured to couple to wires of an end effector disposed at a distal end of the second link; and
    a coils array disposed proximate the PCB and the permanent magnets, wherein the power generator is configured to generate electrical power based on relative angular mechanical movement associated with the elbow, and wherein the end effector is to receive the electrical power via the wires.

11. The power generator of claim 10, wherein at least a portion of the permanent magnets are arranged in a Halbach array.

12. The power generator of claim 10, wherein the relative angular mechanical movement is associated with one or more of:
    first rotation of the first link about the axis of the elbow;
    second rotation of the second link about the axis of the elbow; or
    third rotation of a transmission element about the axis of the elbow, wherein the transmission element is configured to be disposed in the elbow to magnify transmission of rotation velocity based on the relative angular mechanical movement to increase power generation.

13. The power generator of claim 12, wherein the transmission element comprises a magnetic gear comprising:
    a high velocity rotor attached to the permanent magnets;
    a low velocity rotor attached to an inner sidewall of the elbow; and
    a flux modulator attached to the first link, wherein at least a portion of the flux modulator is disposed between the high velocity rotor and the low velocity rotor.

14. The power generator of claim 10, wherein the electrical power is to be used by one or more of:
    a communication component of the end effector;
    a plunger of the end effector;
    a heater of the end effector; or
    one or more sensors of the end effector.

15. The power generator of claim 10, wherein a power storage component is configured to receive the electrical power from the power generator and to provide the electrical power to the end effector.

16. A method comprising:
    generating, by a generator disposed in an elbow of a robot device, electrical power based on relative angular mechanical movement associated with the elbow, wherein a first link of the robot device is coupled to a second link of the robot device via the elbow, and wherein one or more of the first link or the second link rotates about an axis of the elbow; and providing, via one or more wires, the electrical power to an end effector disposed at a distal end of the second link.

17. The method of claim 16, wherein the generator comprises:
   a printed circuit board (PCB) coupled to the one or more wires of the end effector;
   permanent magnets disposed between the PCB and the first link; and
   a coils array disposed proximate the PCB and the permanent magnets.

18. The method of claim 16 further comprising:
   magnifying, via a transmission element disposed in the elbow, transmission of rotation velocity based on the relative angular mechanical movement to increase power generation.

19. The method of claim 18, wherein the relative angular mechanical movement is associated with one or more of:
   first rotation of the first link about the axis of the elbow;
   second rotation of the second link about the axis of the elbow; or
   third rotation of the transmission element about the axis of the elbow.

20. The method of claim 18, wherein the transmission element comprises a magnetic gear comprising:
   a high velocity rotor attached to permanent magnets of the generator;
   a low velocity rotor attached to an inner sidewall of the elbow; and
   a flux modulator attached to the first link, wherein at least a portion of the flux modulator is disposed between the high velocity rotor and the low velocity rotor.

\* \* \* \* \*